United States Patent
Sakuma et al.

(10) Patent No.: US 11,111,151 B2
(45) Date of Patent: Sep. 7, 2021

(54) LAYERED SILICATE POWDER GRANULES AND METHOD FOR PRODUCING THE SAME

(71) Applicant: NATIONAL INSTITUTE FOR MATERIALS SCIENCE, Tsukuba (JP)

(72) Inventors: Hiroshi Sakuma, Tsukuba (JP); Kenji Tamura, Tsukuba (JP)

(73) Assignee: NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 69 days.

(21) Appl. No.: 16/308,249

(22) PCT Filed: Sep. 4, 2017

(86) PCT No.: PCT/JP2017/031752
§ 371 (c)(1),
(2) Date: Dec. 7, 2018

(87) PCT Pub. No.: WO2018/051826
PCT Pub. Date: Mar. 22, 2018

(65) Prior Publication Data
US 2019/0263667 A1    Aug. 29, 2019

(30) Foreign Application Priority Data

Sep. 13, 2016 (JP) ............................. JP2016-178121

(51) Int. Cl.
*C01B 33/38* (2006.01)
*C01B 33/40* (2006.01)
(Continued)

(52) U.S. Cl.
CPC ............. *C01B 33/405* (2013.01); *B01J 20/12* (2013.01); *B01J 20/283* (2013.01); *B01J 20/30* (2013.01);
(Continued)

(58) Field of Classification Search
CPC .............................. C01B 33/405; C01B 33/26
See application file for complete search history.

(56) References Cited

U.S. PATENT DOCUMENTS 5,306,338 A * 4/1994 Tsunekawa ............ A61K 6/69
106/35
6,832,037 B2 * 12/2004 Aylward ................ G02B 6/138
385/145
(Continued)

FOREIGN PATENT DOCUMENTS

JP    S64-042347 A    2/1989
JP    H01-202658 A    8/1989
(Continued)

OTHER PUBLICATIONS

PCT/ISA/210, "International Search Report for International Application No. PCT/JP2017/031752," dated Oct. 10, 2017.
(Continued)

*Primary Examiner* — Stuart L Hendrickson
(74) *Attorney, Agent, or Firm* — Manabu Kanesaka (57) ABSTRACT

The invention has for its object to use an evaporation-spray drying process thereby providing layered silicate powder granules, each one containing a flat particle having an opening or recess in its surface center. Each of the layered silicate powder granule contains a flat particle including a layered silicate formed by evaporation-spray drying and a rheology modifier for modifying the crystal edge face of the layered silicate and having an opening or recess in its surface center.

17 Claims, 3 Drawing Sheets

(51) Int. Cl.
    *B01J 20/12*     (2006.01)
    *B01J 20/283*     (2006.01)
    *B01J 20/30*     (2006.01)
    *B01J 21/16*     (2006.01)
    *B01J 37/00*     (2006.01)
    *C01B 33/42*     (2006.01)
    *C09D 1/02*     (2006.01)
    *C09D 5/03*     (2006.01)
    *C09D 17/00*     (2006.01)
    *C01B 33/20*     (2006.01)

(52) U.S. Cl.
    CPC ........... *B01J 21/16* (2013.01); *B01J 37/0072* (2013.01); *C01B 33/20* (2013.01); *C01B 33/42* (2013.01); *C09D 1/02* (2013.01); *C09D 5/031* (2013.01); *C09D 17/007* (2013.01); *C01P 2002/70* (2013.01); *C01P 2004/02* (2013.01); *C01P 2004/03* (2013.01); *C01P 2004/24* (2013.01); *C01P 2004/52* (2013.01); *C01P 2004/64* (2013.01); *C01P 2004/90* (2013.01)

(56) References Cited

U.S. PATENT DOCUMENTS

| | | | |
|---|---|---|---|
| 7,387,752 | B2 | 6/2008 | Canova et al. |
| 7,393,883 | B2 * | 7/2008 | Jones ............... A61K 6/893 523/116 |
| 8,668,770 | B2 * | 3/2014 | Saghiri ............... B82Y 30/00 106/35 |
| 2011/0244238 | A1 | 10/2011 | Panz et al. |
| 2012/0295113 | A1 | 11/2012 | Kurizoe et al. |
| 2016/0236174 | A1 | 8/2016 | Lawry et al. |

FOREIGN PATENT DOCUMENTS

| | | |
|---|---|---|
| JP | 2005-219972 A | 8/2005 |
| JP | 2008-505835 A | 2/2008 |
| JP | 2012-504102 A | 2/2012 |
| JP | 2012-082368 A | 4/2012 |
| JP | 2012-111650 A | 6/2012 |
| JP | WO2011/081103 A1 | 5/2013 |
| JP | 2015-024941 A | 2/2015 |
| JP | 2015-189590 A | 11/2015 |
| JP | 2015-199535 A | 11/2015 |
| WO | 2015/040426 A | 3/2015 |

OTHER PUBLICATIONS

Non-Patent Publication: Soft Matter, vol. 8, pp. 1955-1963, Nanocomposite silica surfactant microcapsules by evaporation induced self assembly: turning the morphological buckling by modifying viscosity and surface charge; Sen et al, 2012.

Non-Patent Publication: Soft Matter, vol. 6, No. 17, pp. 4070-4083, RSC Publishing; Sep. 7, 2010.

* cited by examiner

LAYERED SILICATE POWDER GRANULES AND METHOD FOR PRODUCING THE SAME

RELATED APPLICATIONS

The present application is National Phase of International Application No. PCT/JP2017/031752 filed Sep. 4, 2017, and claims priority from Japanese Application No. 2016-178121, filed Sep. 13, 2016, the disclosure of which is hereby incorporated by reference herein in its entirety.

ART FIELD

The present invention relates to layered silicate powder granules containing flat particles, each one having an opening or recess in its surface center.

The present invention is also concerned with a method for producing layered silicate powder granules containing flat particles, each one having an opening or recess in the surface center, from a fluid raw material containing layered silicates using an evaporation-spray drying process.

BACKGROUND ART

Agglomerates obtained by spraying of droplets of a ceramic fluid raw material and drying them by contact with a high-temperature air are now expected to have applications to a wide range of fields, such as composite materials, catalysts and pharmaceuticals because they are obtained in various powdery forms depending on production process conditions and because their simple production process benefits much in terms of products cost. So far some proposals have been put forward inclusive of spherical clay particles (Patent Publications 1, 2, 5), spherical alumina particles (Patent Publication 3), doughnut-like silica particles (Non-Patent Publication 1), doughnut-like chitosan particles (Non-Patent Publication 2), petal-like clay particles (Patent Publication 4) and hollow clay particles (Patent Publication 6).

The spherical clay particles in particular have been practically used in the form of liquid chromatography column fillers (Patent Publication 1). In this liquid chromatography column, a carrier having a separable, cationic metal-complex enantiomer carried on the surface of the clay mineral taking advantage of its cation adsorption capability is filled in a stainless tube so that an enantiomer in racemic mixtures can undergo optical resolution with no dissolution or deterioration of the metal complex.

On the other hand, a granulated material having a pore inside is capable of designing a multi-functional powder granule (microencapsulation) by inserting and including other substance into the pore, having potential applications to a wide range of fields such as cosmetics, catalysts and pharmaceuticals. For such purposes, hollow clay particles comprising a layered silicate and an inorganic phosphate have been produced (Patent Publication 6). These hollow particles are as fine as expressed by an average particle diameter of 20 nm to 500 nm inclusive.

PRIOR ARTS

Patent Publications

Patent Publication 1: JP(A) 1-42347
Patent Publication 2: JP(A) 1-202658
Patent Publication 3: Japanese Unexamined Patent Application Publication No. 2008-505835
Patent Publication 4: JP(A) 2012-82368
Patent Publication 5: JP(A) 2012-111650
Patent Publication 6: JP(A) 2015-24941

Non-Patent Publications

Non-Patent Publication 1: Soft Matter, Vol. 8, pp. 1955-1963 (2012)
Non-Patent Publication 2: Soft Matter, Vol. 6, pp. 4070-4083 (2010)

SUMMARY OF THE INVENTION

Problems with the Prior Art

Layered silicate powder granules produced so far in the art have been limited only to spherical particles, petal-like particles, or hollow particles having no opening. Here take an application to liquid chromatography column fillers as an example. For the purpose of improving separation efficiency, the spherical particle size must be reduced to increase the specific surface area. However, excessive particle size reductions give rise to clogging and render fast fluidization of an eluting solution impossible, resulting conversely in a lowering of processing efficiency. For microencapsulation, on the other hand, the absence of openings in conventional layered silicate hollow particles renders the insertion of substances in a post-granulation secondary process badly hard.

With silica ($SiO_2$), there are doughnut-like particles obtained each one having an opening in the surface center, and a specific surface area larger than that of spherical particle may prima facie be obtained while the particle diameter is kept. Unlike layered silicate particles, however, silica particles are incapable of selective adsorption of cations.

Doughnut-like chitosan particles cannot be used as any column filler due to its large particle diameter (of 0.6 mm in mean particle diameter).

With the foregoing prior art in mind, an object of the present invention is to produce flat particles of a layered silicate, each one having an opening or recess in its surface center, thereby providing functional powder granules useful for chromatography, cosmetics, catalysts, pharmaceuticals (for biologically active agent protection, drug delivery or the like), pigments, coating materials and so on.

EMBODIMENTS OF THE INVENTION

According to one embodiment of the invention, there is a layered silicate powder granule provided, which comprises a layered silicate formed by evaporation-spray drying and a rheology modifier for modifying a crystal edge face of the layered silicate, and which has an opening or recess in its surface center.

A layered silicate having the following composition formula is preferably used for the layered silicate powder granules according to the invention.

where n is a natural number of 1 to 3; $0.1 \leq a \leq 0.8$, $0 \leq c \leq 3$, $0 \leq d \leq 2$, $2 \leq c+d \leq 3$, $0 \leq e < 4$, and $0 \leq f \leq 2$; E is an interlayer n-valent cation and at least one atom selected from the group consisting of H, Li, Na, Mg, Ca, Zn, Sr, Fe, Ba, Ni, Cu, Co, Mn, Al, and Ga; and M1 and M2 are each a metal coming in an octahedron formed in a 2:1 type sheet, M1 being at least one metal selected from the group consisting of Mg, Fe, Mn, Ni, Zn, and Li, and M2 being at least one metal selected from the group consisting of Al, Fe, Mn, and Cr.

In the layered silicate powder granule of the invention, the layered silicate is preferably at least one selected from the group consisting of smectites, swelling synthetic micas, and vermiculites.

In the layered silicate powder granule of the invention, the smectites are preferably selected from montmorillonite, beidellite, nontronite, saponite, hectorite and stevensite.

In the layered silicate powder granule of the invention, the swelling synthetic micas are preferably selected from Na-tetrasilisic mica and Na-taeniolite. In the layered silicate powder granule of the invention, the vermiculites are preferably selected from dioctahedral type vermiculite and trioctahedral type vermiculite.

In the layered silicate powder granule of the invention, the rheology modifier for modifying the crystal edge face of the layered silicate is preferably an anionic compound.

In the layered powder granule of the invention, the rheology modifier for modifying the crystal edge face of the layered silicate is preferably used in an amount of 1 to 20 parts by mass per 100 parts by mass of the layered silicate.

In the layered silicate powder granule of the invention, the flat particle preferably has an outer diameter of greater than 500 nm and less than 50 μm as measured under a microscope, and the specific surface area ($S_t/V_t$) of the flat particle that is defined by a surface area ($S_t$) to volume ($V_t$) ratio is preferably 1.1 to 2.0 times as large as that of a sphere having the same volume.

In the layered silicate powder granule of the invention, it is preferable that the layered silicate powder granule contains 60% or greater of the flat particles (counted as the number of particles) and 20% or less of spherical particles (counted as the number of particles), and the flat particle has a maximum particle diameter of 50 μm or less.

In the method for producing a layered silicate powder granule according to the invention, it is preferable that droplets of a suspension containing a layered silicate and a rheology modifier for modifying a crystal edge face of the layered silicate are sprayed and blown onto a centrifugal disc, and a film of the suspension formed in a disc shape is scattered by fast rotation of the centrifugal disc, after which a dispersion medium is evaporated and dried.

In the method for producing a layered silicate powder granule according to the invention, a layered silicate used as the previously mentioned layered silicate preferably has a mean particle diameter of 10 nm to 100 nm as found by choosing particles at random, measuring one direction diameters of them along the crystal ab-axes under a microscope and taking an average.

In the method for producing a layered silicate powder granule according to the invention, the suspension containing a layered silicate and a rheology modifier for modifying the crystal edge face of the layered silicate has preferably a solid matter concentration of 0.1 to 20% by mass.

In the method for producing a layered silicate powder granule according to the invention, the layered silicate powder granules are preferably heated at a temperature of 350 to 800° C.

The layered silicate powder granules of the invention provide useful functional powders for chromatography, drug delivery, catalysts, biologically active agent protection, pigments, or coatings.

ADVANTAGES OF THE INVENTION

The layered silicate powder granule of the invention contains a doughnut-like flat particle or a mushroom-like flat particle. Non-Patent Publication 2 teaches that the specific surface area of the doughnut-like flat particle is larger (about 1.5 times) than that of a spherical particle having the same volume. The mushroom-like flat particle has an inside pore in which a substance is directly included. For these reasons, the obtained flat particles may provide functional powders for chromatography, drug delivery, catalysts, biologically active agent protection, pigments, or coatings.

With the method for producing layered silicate powder granules according to the invention wherein the suspension including the layered silicate and rheology modifier is sprayed and blown onto the centrifugal disc while the rotation number of the centrifugal disc is adjusted, it is possible to efficiently produce flat particles having a controlled particle size distribution. With the production method of the invention wherein water may be used as the solvent for the suspension, it is possible to simply produce a great lot of flat particles because the solvent is free from any substance having an adverse influence on the human body, dispensing with additional treatments such as removal of harmful substances.

BRIEF EXPLANATION OF THE DRAWINGS

Figure 1:
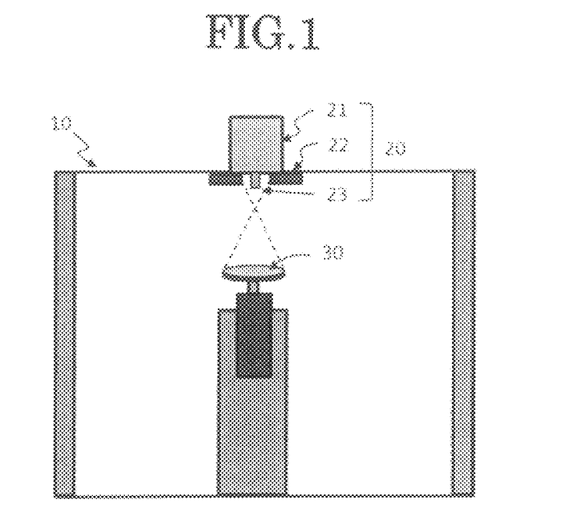

FIG. 1 is a schematic view of an evaporation-spray drier comprising a combined gas atomizer and centrifugal atomizer.

Figure 2:
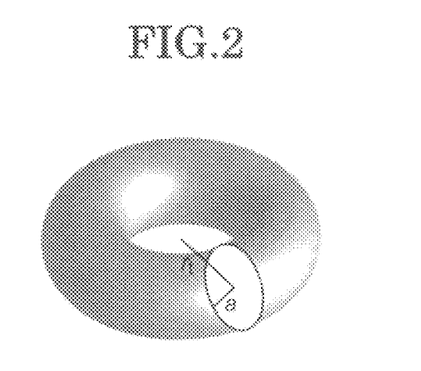

FIG. 2 is a diagram illustrative of a definition for two radii that defines the geometry of a flat particle having an opening in the surface center and figures out the surface area and volume of the flat particle.

Figure 3:
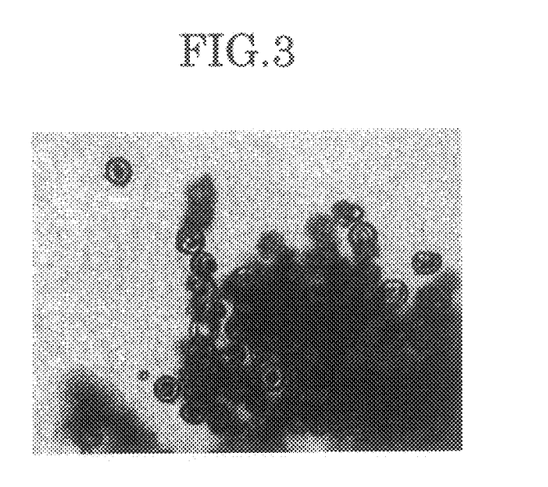

FIG. 3 is an optical microphotograph taken of flat particles formed of a layered silicate (LAPONITE RDS). Note that the length of the white line corresponds to 10 μm.

Figure 4:
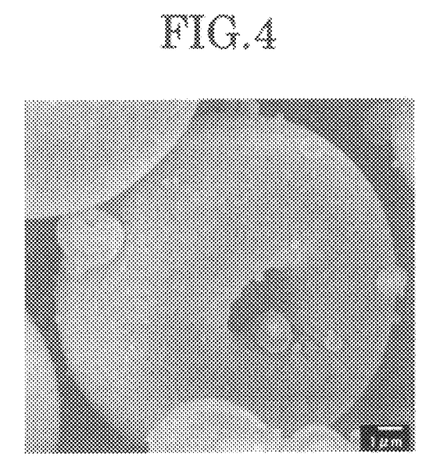

FIG. 4 is a scanning electron microscope image taken of a doughnut-shaped particle formed of the layered silicate (LAPONITE RDS).

Figure 5:
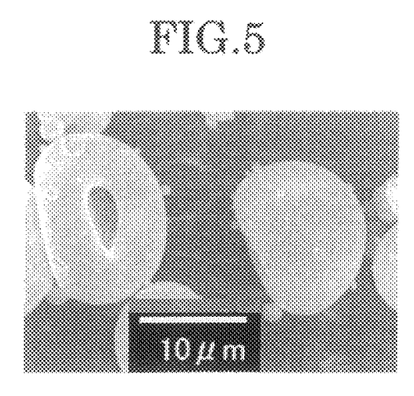

FIG. 5 is a scanning electron microscope image taken of a mushroom-shaped particle formed of the layered silicate (LAPONITE RDS).

Figure 6:
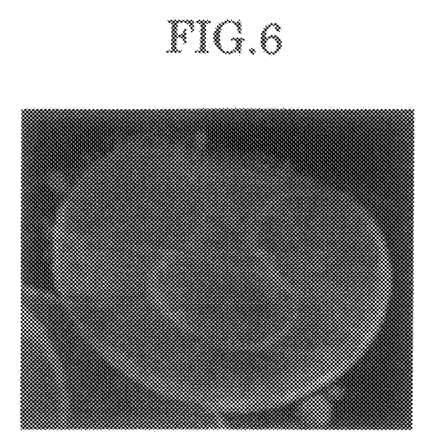

FIG. 6 is an X-ray CT (computed tomography) image taken of the mushroom-shaped particle formed of the layered silicate (LAPONITE RDS).

Figure 7:
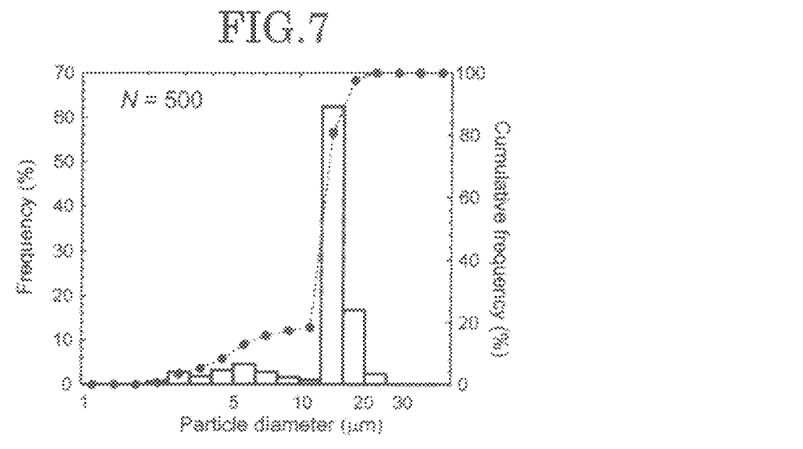

FIG. 7 is a graph representative of the particle size distribution (Frequency, Bar Graph) and the cumulative value of the particle size distribution (Cumulative Frequency, Filled Circle) of flat particles formed of the layered silicate (LAPONITE RDS).

Figure 8:
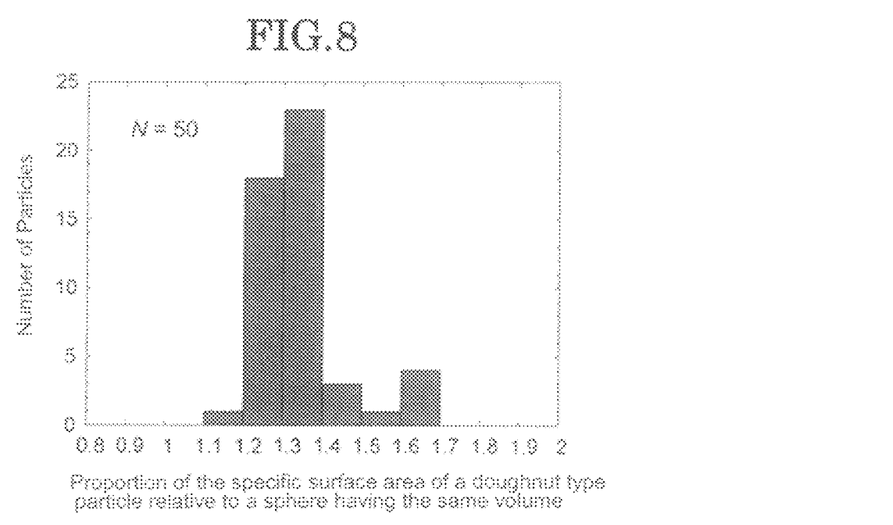

FIG. 8 is a graph representative of the frequency distribution of the ratio of the specific surface area of a doughnut-shaped particle relative to a sphere having the same volume.

Figure 9:
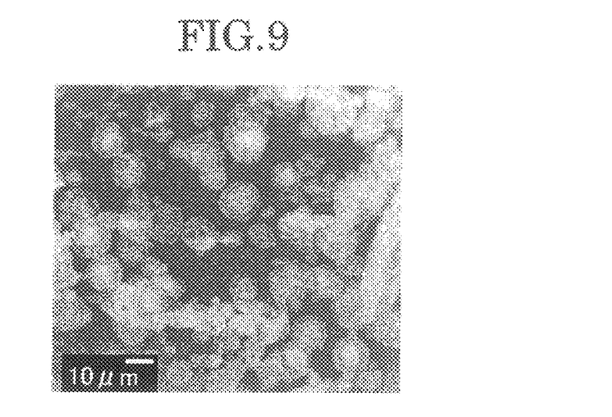

FIG. 9 is a scanning electron microscope image taken of a spherical particle produced of the layered silicate (LAPONITE RD).

MODES FOR CARRYING OUT THE INVENTION

By way of example but not by way of limitation, the present invention is now explained with reference to some specific examples. First of all, reference is made to the layered silicate used herein.

The layered silicate used herein comprises a unit layer consisting of one octahedral sheet and two tetrahedral sheets laminated in tetrahedral sheet/octahedral sheet/tetrahedral sheet order. In the tetrahedral sheet, O atoms exist at the respective apexes of a tetrahedron with a Si atom as center while they are joined together, and in the octahedral sheet, six O atoms or OH groups exist at the apexes of an octahedron with Mg, Mn, Al or the like as center while they are joined together. A structure having a tetrahedral sheet/octahedral sheet/tetrahedral sheet laminated in this order is called the 2:1 type structure.

As the silicate layer of this 2:1 type structure is short of positive charges by way of isomorphous replacement in it, it causes cations to exist as exchangeable cations between the layers corresponding to the replacement amount. At this time, the negative charges of the 2:1 type structure are called the layer charges, and minerals of the 2:1 type structure are classified depending on this charge value (defined by the absolute value of charges per 2:1 type composition formula): 0 for talc and pyrophyllite, 0.2 to 0.6 for smectite, 0.6 to 0.9 for vermiculite, 0.6 to 1.0 for mica and mica clay minerals, 0.8 to 1.2 for chlorite, and ~2 for brittle mica.

The layered silicate having the following composition formula is preferably used for the layered silicate powder granules according to the invention.

$$[(E^{n+})_{a/n}(M1_cM2_d)(Si_{4-e}Al_e)O_{10}(OH_fF_{2-f})]$$

where n is a natural number of 1 to 3; $0.1 \le a \le 0.8$, $0 \le a \le 0.8$, $0 \le c \le 3$, $0 \le d \le 2$, $2 \le c+d \le 3$, $0 \le e < 4$, and $0 \le f \le 2$; E is an interlayer n-valent cation and at least one atom selected from the group consisting of H, Li, Na, Mg, Ca, Zn, Sr, Fe, Ba, Ni, Cu, Co, Mn, Al, and Ga; and M1 and M2 are each a metal coming in an octahedron formed in a 2:1 type sheet, M1 being at least one metal selected from the group consisting of Mg, Fe, Mn, Ni, Zn, and Li, and M2 being at least one metal selected from the group consisting of Al, Fe, Mn, and Cr.

Referring to a composition preferable for the formation of a suspension applied to evaporation-spray drying in the layered silicate powder granules of the invention, the amount of a composition preferable for interlayer cations (E) is $0.1 \le a \le 0.8$ in general and $0.3 \le a \le 0.7$ in particular. As "a" gets less than 0.1, it causes the amount of interlayer cations to be too small to be rich in water swelling, and as "a" gets greater than 0.8, it causes the layer charges that the unit layer has to go high with the result that the attracting force between layers grows strong, both leads to difficulty in preparation of any uniform suspension. In any case, the resulting suspension is not preferable for feeding to the evaporation-spray drying process.

In the layered silicate powder granules of the invention, there is no limitation on the layered silicate used as long as it is able to swell in solvents; specific mention is preferably made of smectites represented by montmorillonite, beidellite, nontronite, saponite, hectorite and stevensite, swelling synthetic micas such as Na-tetrasilisic mica and Na-taeniolite, and vermiculites such as dioctahedral type vermiculite and trioctahedral type vermiculite. Of these layered silicates, the smectites and vermiculites may be naturally occurring minerals or synthetic materials such as those obtained by hydrothermal synthesis, melt synthesis, and solid-phase synthesis. In the invention, the layered clay minerals may be used alone or in combination of two or more.

In the layered silicate powder granules of the invention, the primary particle diameter of the layered silicate used as the raw material may be measured with the aid of transmission electron microscope (TEM) images, scanning electron microscope (SEM) images or scanning probe microscopes (SPM). Where the starting primary particles are agglomerated and solidified into secondary particles, the secondary particles are dispersed to the primary ones for measurement. In this event, the constant direction diameter (Green diameter) of layered silicate crystals in the ab-axis direction may be measured to define the number average of particle diameter measurements as an average or mean particle diameter.

The mean primary particle diameter of the layered silicate used herein is in the range of preferably 10 nm to 100 nm, and more preferably 20 nm to 80 nm. At less than 10 nm, it is difficult to produce and purify layered silicate crystals, and at greater than 100 nm, the particle barrier wall gets deteriorated in smoothness, possibly failing to gain shape control.

A layered silicate dispersed in water in general, and a smectite suspension in particular is placed in a colloidal state where there is a sol formed, but with increasing concentration, the sol increases in viscosity, exhibiting very high thixotropy with a certain concentration as boundary. This is because while the layer plane (tetrahedron sheet) has no bond deficiency, the end plane is made up of a bond deficiency where there is a break in Si—O, Al—O, Mg—O, O—O or the like with the consequence that both the layer plane and the end plane are attracted to each other due to varying charges, forming a gel (card-house structure). As the solvent is evaporated off with an increasing solid concentration when the smectite suspension is subjected to evaporation-spray drying, the scattered suspension is rapidly gelled, forming an agglomerated powder having a packed core.

In the invention, the rheology modifier for modifying the crystal edge face of the layered silicate is used to maintain a stable, high-concentration fluid dispersion (sol) state in the evaporation-spray drying process. There is no limitation on the rheology modifier used herein as long as it is capable of adsorption onto the edges of the layered silicate particle. Useful for this purpose is an anionic compound, a compound having a hydroxyl group, and a compound having an alkoxyl group. The anionic compound in particular behaves as a good dispersant because it can easily be adsorbed onto the edges of the layered silicate particles in slurry to have charges, generating an electrical repulsive force between the particles. As a result, there are flat particles obtained with a high porosity. Although the reason has yet to be clarified, it has been considered that while fluidity is well kept even at the time of a rapid increase in the solid concentration in the evaporation-spray drying process (spray formation of atomized sol particles→drying→formation of agglomerate), ensuring that a solvent-solid, core-shell structure is formed by way of end-to-end bonds.

The possible anionic compounds for the modification of the crystal edge faces of the layered silicate preferably include phosphates, carboxylic acids, sulfonates, or sulfates.

The phosphates are represented by salts containing monobasic phosphate ions ($H_2PO_4^-$), dibasic phosphate ions ($HPO_4^{2-}$), tribasic phosphate ions ($PO_4^{3-}$), diphosphate ions ($P_2O_7^{4-}$), triphosphate ions ($P_3O_{10}^{5-}$), polyphosphate ions ($P_nO_{3n+1}^{(n+1)-}$) and organophosphate ions, and specifically include monopotassium phosphate, dipotassium phosphate, tripotassium phosphate, potassium pyrophosphate, pentapotassium triphosphate, potassium tripolyphosphate, potassium metaphosphate, monocalcium phosphate, dicalcium phosphate, tricalcium phosphate, acidic calcium pyrophosphate, calcium pyrophosphate, monosodium phosphate, disodium phosphate, trisodium phosphate, sodium pyrophosphate, pentasodium triphosphate, acidic sodium pyrophosphate, sodium tripolyphosphate, sodium tetrapolyphosphate, sodium pentapolyphosphate, sodium metaphosphate, acidic sodium metaphosphate, sodium phosphite, sodium hypophosphite, monobasic magnesium phosphate, dibasic magnesium phosphate, tribasic magnesium phosphate, magnesium pyrophosphate, magnesium metaphosphate, monobasic aluminum phosphate, dibasic aluminum phosphate, tribasic aluminum phosphate, aluminum metaphosphate, monobasic ammonium phosphate, dibasic ammonium phosphate, tribasic ammonium phosphate, ammonium pyrophosphate, ammonium tripolyphosphate, ammonium metaphosphate, calcium super phosphate, lauryl phosphate, sodium lauryl phosphate, and potassium lauryl phosphate.

The carboxylic acids include a saturated fatty acid such as propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, and octadecanoic acid, and its metal salt.

The carboxylic acids also include an aromatic carboxylic acid such as benzoic acid (benzene carboxylic acid), phthalic acid (benzene-1,2-dicarboxylic acid), isophthalic acid (benzene-1,3-dicarboxylic acid), terephthalic acid (benzene-1,4-dicarboxylic acid), salicylic acid (2-hydroxybenzene carboxylic acid), gallic acid (3,4,5-trihydroxybenzene carboxylic acid), mellitic acid (benzene hexacarboxylic acid), cinnamic acid (3-phenyl-2-propenoic acid), or its metal salt.

Further, the carboxylic acids include a polycarboxylic acid such as oxalic acid (ethanedioic acid), malonic acid (propanedioic acid), succinic acid (butanedioic acid), glutaric acid (pentanedioic acid), adipic acid (hexanedioic acid), fumaric acid ((E)-2-butenedioic acid), maleic acid ((Z)-butenedioic acid), aconitic acid (1-propene-1,2,3-tricarboxylic acid), and its metal salt.

Furthermore, the carboxylic acids include an unsaturated fatty acid such as oleic acid, linolic acid, linolenic acid, arachidonic acid, eicosapentaenoic acid, docosahexaenoic acid and sorbic acid, and its metal salt, and a hydroxy acid such as lactic acid (2-hydroxypropanoic acid), malic acid (2-hydroxybutanedioic acid) and citric acid (2-hydroxypropanetricarboxylic acid) and its metal salt. The metal salt of citric acid is exemplified by monosodium citrate, ammonium citrate, disodium citrate, trisodium citrate, ammonium ferric citrate or the like.

The sulfonates include sodium 1-hexanesulfonate, sodium 1-octanesulfonate, sodium 1-decanesulfonate, sodium 1-dodecanesulfonate, perfluorobutane sulfonic acid, sodium alkylbenzenesulfonate, sodium toluenesulfonate, sodium cumenesulfonate, sodium octylbenzenesulfonate, sodium naphthalenesulfonate, disodium naphthalenedisulfonate, trisodium naphthalenetrisulfonate, sodium butylnaphthalenesulfonate or the like.

The sulfates include sodium lauryl sulfate, sodium myristyl sulfate, sodium laureth sulfate, sodium polyoxyethylenealkylphenol sulfate, ammonium lauryl sulfate or the like.

In the layered silicate used herein, the mixing or compounding ratio between the layered silicate and the rheology modifier for the modification of the crystal edge face of the layered silicate is in the range of preferably 1 to 20 parts by mass, and more preferably 3 to 10 parts by mass of the rheology modifier per 100 parts by mass of the layered silicate. As the rheology modifier is in an amount of less than 1 part by mass per 100 parts by mass of the layered silicate, it causes the proportion of spherical solid particles to get high, and an amount of greater than 20 parts by mass causes a bridged structure between the layered silicate particles in the dispersion to become unstable, often rendering it difficult to form the desired flat particles.

In the layered silicate powder granule of the invention, it is preferable that the outer diameter of the flat particle is 500 nm to 50 μm as found by way of a scanning electron microscope image, and the specific surface area of the flat particle ($S_t/V_t$) that is defined by a ratio of the surface area ($S_t$) relative to the volume ($V_t$) of the flat particle is 1.1 to 2.0 times as large as that of a sphere having the same volume. More preferably, that outer diameter is 1 to 30 μm and that specific surface area is 1.3 to 1.6 times as large as that of the sphere having the same volume. At an outer diameter of less than 500 nm, there is a possibility that an opening-free hollow particle may be formed, and at greater than 50 μm, the ensuing particles may possibly have uneven pore diameters, giving rise to a deterioration of function. As the specific surface area is below 1.1 times as large as that of the sphere having the same volume, on the other hand, insufficient flatness may possibly render it impossible to take in other substance, and a specific surface area of greater than 2.0 times may possibly give rise to uneven shape and, hence, a deterioration of function.

It is here understood that the shape of a flat particle, because of having an anisotropic shape and particle size distribution, is preferably measured by a direct method—wherein individual particles are directly observed through a transmission electron microscope, a scanning electron microscope, a laser microscope, a digital microscope or the like to measure their diameters and find a number-average value—rather than an indirect method that relies upon a weight-of-sedimentation method, a centrifugal sedimentation light transmission method, a laser diffraction scattering method or the like. The aforesaid outer diameter is also represented by this number-average value.

Although the specific surface area ($S_t/V_t$) may be found by a shape measurement method making use of a microscope or X-ray imaging, a fluid penetration method, a gas adsorption method or the like, on the other hand, it is particularly preferable to utilize a shape measurement method making use of a transmission electron microscope (TEM) image, a scanning electron microscope (SEM) image or a scanning probe microscope (SPM) with the size of a flat particle in mind.

Although the solvent used for the dispersion of the layered silicate and phosphate is based mainly on water, it may be admixed with an alcohol (such as a lower alcohol such as methanol, ethanol or propanol) and/or a polyhydric alcohol.

The method for producing layered silicate powder granules according to the invention will now be explained.

For the evaporation-spray drying process used herein, known means may be used just the way they are. Typically, use may be made of a process in which a finely granulated fluid is sprayed (atomized) in a high-temperature gas stream for drying and powdering such as a process using a twin-fluid atomizing valve, a process using a pressure atomizing valve, a process using a centrifugal atomizer, a process using an 
electrostatic atomizer, a process using a vibrating nozzle, a process using an acoustic atomizer, or a combination of two or more.

Particular preference is given to a process in which droplets of a suspension containing the layered silicate and the rheology modifier for modifying the crystal edge faces of the layered silicate are sprayed and blown onto a centrifugal disc, and the ensuing disc-like suspension film is scattered off by fast rotation of the centrifugal disc, after which the dispersion medium is evaporated and dried, i.e., combination of the aforesaid process using a twin-fluid atomizing valve (gas atomizer) and centrifugal atomizer (rotary disc atomizer).

FIG. 1 is illustrative of the basic arrangement of an evaporation-spray dryer comprising a combined gas atomizer and centrifugal atomizer. The present apparatus is built up of a cylindrical chamber (10) for carrying out spraying inside, a centrifugal disc (30) that is located within the chamber (10) for centrifugal spraying of the raw material, and a raw material feeder mechanism (20) for feeding the raw material to the centrifugal disc (30).

Located above the chamber (10), the raw material feeder mechanism (20) includes, and is built up of, a raw material tank (21) having at its lower end an outlet (23) out of which the raw material flows down toward the center of rotation of the centrifugal disc (30), and a gas spraying nozzle (22) for jetting the raw material flowing down out of the outlet (23) toward the centrifugal disc (30).

When the evaporation-spray drier shown in FIG. 1 is used to produce the layered silicate powder granules, droplets of a suspension flowing down out of the outlet (23) of the raw material tank (21) are generated by gas jetted out of the gas spraying nozzle (22), and blown onto the centrifugal disc (30) that rotates at high speed. The suspension blown onto the centrifugal disc (30) takes the form of a thin film that is in turn scattered off by centrifugal force resulting from rotations as fine droplets within the chamber (10). The suspension scattered off as fine droplets within the chamber (10) falls onto the bottom of the chamber (10), during which the droplets are warmed by a heater (not shown) so that the liquid matter is removed by evaporation. The thus sprayed and dried matter is taken out and collected together with the gas jetted out of the gas spraying nozzle (22).

Referring then to the running or operating conditions for the evaporation-spray drier, it is preferable that the suspension flowing down out of the outlet (23) is fed at a feed rate of 0.4 to 1.0 mL/s and the revolutions or rotations of the centrifugal disc (30) per minute are set at 10,000 to 60,000 rpm. The setting of the feed rate of the suspension to 0.4 mL/s or more enables the amount of the layered silicate powder grains obtained per unit time to grow so large that they can be produced with higher efficiency, and the setting of the feed rate of the suspension to 1.0 mL/s or less makes it possible to obtain layered silicate powder granules containing flat particles in higher proportions. The setting of the centrifugal disc's rotation number in the range of 10,000 to 60,000 rpm renders it possible to obtain layered silicate powder granules containing flat particles in higher proportions.

In the process for producing layered silicate powder granules according to the invention, the sprayed and dried matter obtained as mentioned above is heated at a temperature of 350 to 800° C. so that the water resistance of flat particles can be brought high. More preferable processing conditions range from 450 to 700° C. As this firing temperature is below 350° C., it may possibly cause the water resistance to become insufficient because of the restoration of water back between layered silicate layers, and firing temperatures of greater than 900° C. may possibly cause the layered silicate to transfer to a glassy state, failing to maintain surface's capability of adsorbing substances.

EXAMPLES

The present invention will now be explained in more details with reference to the examples of the invention.

First of all, there is the mention of the method used herein for estimating the specific surface area of the flat particle with an opening in its surface center.

1. Observation of the Particle Morphology

With the aid of a scanning electron microscope (JSM-6700F available from JEOL Ltd.), the post-swelling particle morphology was observed at an accelerating voltage of 15 kV, and an optical microscope (E400POL available from Nikon Corporation) was used for wide-field observations. For the observation of recesses, X-ray CT images were taken in Synchroton radiation facility Spring-8 (RIKEN Harima).

2. Estimation of the Specific Surface Area

As depicted in FIG. 2, the radii $r_t$ and "a" of large and small circles of a flat particle are measured from a scanning electron microscope image. The volume $V_t$ of the flat particle is calculated out of two such radius values according to Formula (1), and the surface area $S_t$ of the flat particle is figured out according to Formula (2). From these results, the specific surface area of the flat particle having an opening in its surface center is estimated as $S_t/V_t$.

It is here noted that Formula (1) is provided to calculate the volume of a flat particle having an opening in the surface center, and Formula (2) is provided to calculate the surface area of a flat particle having an opening in the surface center.

$$V_t=2\pi^2 r_t a^2 \quad \text{Formula (1):}$$

$$S_t=4\pi^2 r_t a \quad \text{Formula (2):}$$

3. Pass/Fail Estimation of the Formed Flat Particles

After the shapes of 500 particles were measured, estimation was conducted on the basis of the results of particle morphology observation: samples containing flat particles having an outer diameter of greater than 500 nm to not greater than 50 μm and a specific surface area 1.1 to 2.0 times as large as that of a sphere having the same volume in amounts of not less than 60%, not less than 40%, not less than 10% and less than 10% are estimated as ⊚, ○, Δ and ×, respectively. The estimation criteria ⊚, ○ and Δ are used as a pass basis for the production of flat particles.

Example 1

Synthetic hectorite (LAPONITE RDS made by BYK) containing 8% by mass of tetrasodium pyrophosphate was used as the layered silicate. 5 grams of the layered silicate were dispersed in 495 mL of water with the aid of a magnetic stirrer to obtain a suspension containing the layered silicate and rheology modifier and having a solid content concentration (hereinafter called the "raw material concentration") of 1% by mass. The resulting suspension was sprayed and dried by the evaporation-spray dryer (hereinafter called the centrifugal evaporation-spray dryer) built up of a combined gas atomizer and centrifugal atomizer to obtain flat particles of 2 to 25 μm.

The operating conditions for the apparatus are set out in Table 1. An optical microphotograph of the produced particles is presented as FIG. 3, indicating that there is an opening or recess in the surface center.

A scanning electron microphotograph of the produced particle is attached hereto as FIG. 4. From this it is found that the flat particle at the center with a diameter of 10 μm has an opening in its surface center: it is of a so-called doughnut shape. A scanning electron microscope image of FIG. 5 shows that there is a recess in the surface center of a portion of the produced flat particle, and that the particle is of a so-called mushroom-shaped particle. From an X-ray CT image of FIG. 6, it is found that this recess does not penetrate through the particle and that a space within the particle is wider than the inlet.

A particle size (diameter) distribution of the produced flat particles is shown in FIG. 7. This distribution was obtained using 500 particles randomly extracted out of the scanning electron microscope image. The histogram is indicative of the particle size distribution (Frequency), and the filled circle is indicative of the cumulative value (cumulative frequency) of the particle size distribution. Of the particles found to have a particle diameter of 2 to 25 μm, 80% or more had a diameter in the range of 10 to 20 μm, and 60% or more in particular had a particle diameter of 12 to 16 μm.

Out of the obtained particles, a specific surface area distribution of the doughnut-shaped particles is shown in FIG. 8. This distribution was obtained using 50 particles randomly extracted from the scanning electron microscope image. From FIG. 8 it is found that the doughnut-shaped particle has a specific surface area 1.1 to 1.7 times as large as that of a spherical particle having the same volume, most in the range of 1.2 to 1.4 times as large. The results are set out in Table 3.

The experimental conditions for Example 1 are given in Table 1.

TABLE 1

| Dropping Amount of the Suspension (mL) | Dropping Rate of the Suspension (mL/s) | Rotation Number of the Rotary Disc (rpm) | $N_2$ Gas Pressure (MPa) | Disc Diameter (mm) |
| --- | --- | --- | --- | --- |
| 500 | 0.55 | 20,000 | 0.2 | 70 |

Preset Temperatures

| Near the disc (° C.) | Upper heater (° C.) | Middle heater (° C.) | Lower heater (° C.) |
| --- | --- | --- | --- |
| 180 | 190 | 280 | 280 |

Example 2

5 grams of water-swelling clay mineral (Smecton SA made by Kunimine Industries.) and 0.3 gram of tetrasodium pyrophosphate were added to 495 mL of water, and they were then dispersed by a magnetic stirrer to obtain a suspension having a raw material concentration of 1% by mass. The resulting suspension was sprayed and dried by the centrifugal evaporation-spray dryer to obtain flat particles of 0.5 to 30 μm. The operating conditions for the apparatus are set out in Table 2, and the results are set out in Table 3.

The experimental conditions for Example 2 are set out in Table 2.

TABLE 2

| Dropping Amount of the Suspension (mL) | Dropping Rate of the Suspension (mL/s) | Rotation Number of the Rotary Disc (rpm) | $N_2$ Gas Pressure (MPa) | Disc Diameter (mm) |
| --- | --- | --- | --- | --- |
| 500 | 0.64 | 30,000 | 0.2 | 70 |

Preset Temperatures

| Near the disc (° C.) | Upper heater (° C.) | Middle heater (° C.) | Lower heater (° C.) |
| --- | --- | --- | --- |
| 180 | 190 | 280 | 280 |

Example 3

A sample was prepared as in Example 1 with the exception that the rotation number of the rotary disc in Example 1 was changed to 10,000 rpm with the results set out in Table 3.

Example 4

A sample was prepared as in Example 2 with the exception that the rotation number of the rotary disc in Example 2 was changed to 10,000 rpm with the results set out in Table 3.

Example 5

A sample was prepared as in Example 2 with the exception that the rotation number of the rotary disc in Example 2 was changed to 20,000 rpm with the results set out in Table 3.

Example 6

A sample was prepared as in Example 1 with the exception that the rotation number of the rotary disc in Example 1 was changed to 30,000 rpm with the results set out in Table 3.

Example 7

A sample was prepared as in Example 1 with the exception that the raw material concentration in Example 1 was changed to 1.5% by mass with the results set out in Table 3.

Example 8

A sample was prepared as in Example 1 with the exception that the raw material concentration in Example 1 was changed to 2% by mass with the results set out in Table 3.

Example 9

A sample was prepared as in Example 1 with the exception that the raw material concentration in Example 1 was changed to 2.5% by mass with the results set out in Table 3.

Example 10

A sample was prepared as in Example 1 with the exception that the raw material concentration in Example 1 was changed to 3% by mass with the results set out in Table 3.

Example 11

A sample was prepared as in Example 1 with the exception that the rotation number of the rotary disc in Example 1 was changed to 40,000 rpm with the results set out in Table 3.

Example 12

A sample was prepared as in Example 1 with the exception that the rotation number of the rotary disc in Example 1 was changed to 50,000 rpm with the results set out in Table 3.

Example 13

A sample was prepared as in Example 1 with the exception that the rotation number of the rotary disc in Example 1 was changed to 60,000 rpm with the results set out in Table 3.

Example 14

A sample was prepared as in Example 2 with the exception that the rotation number of the rotary disc in Example 2 was changed to 50,000 rpm with the results set out in Table 3.

Example 15

A sample was prepared as in Example 1 with the exception that it was produced only with the aid of the gas atomization process while the rotary disc of Example 1 was removed, and the results are set out in Table 3.

Comparative Example 1

A sample was prepared as in Example 1 with the exception that synthetic hectorite (LAPONITE RD made by BYK) containing no tetrasodium pyrophosphate was used as the layered silicate. As a result, only spherical particles of 0.4 to 29 μm were formed with no formation of any flat particles. The operating conditions for the apparatus are the same as in Example 1. A scanning electron microscope image is shown in FIG. 9 indicating that no flat particle is produced; only spherical particles are produced. The results are set out in Table 3.

Comparative Example 2

A sample was prepared as in Example 2 with the exception of no addition of tetrasodium pyrophosphate. As a result, only spherical particles of 0.4 to 20 μm were formed with no formation of any flat particles. The results are set out in Table 3.

Comparative Example 3

A sample was prepared as in Example 6 with the exception that synthetic hectorite (LAPONITE RD made by BYK) containing no tetrasodium pyrophosphate was used as the layered silicate. The results are set out in Table 3.

Comparative Example 4

A sample was prepared as in Example 11 with the exception that synthetic hectorite (LAPONITE RD made by BYK) containing no tetrasodium pyrophosphate was used as the layered silicate. The results are set out in Table 3.

Comparative Example 5

Five (5) grams of Na-type montmorillonite (Kunipia F made by Kunimine Industries.) used as the layered silicate were dispersed in 495 mL of water to prepare a suspension. A sample was prepared under the conditions of Example 2, but with no addition of any rheology modifier. The results are set out in Table 3. Note here that because Kunipia F used in this comparative example occurs naturally and, hence, has no constant particle size distribution, the particle diameter range is given in the column "raw material's mean particle diameter" of the table instead of the mean particle diameter. With the use of Kunipia F having a mean particle diameter of greater than 100 nm because the raw material has a minimum particle diameter of about 100 nm, there were no flat particles formed even when the layered silicate powder grains were produced under the same conditions as in the examples.

Comparative Example 6

A sample was prepared as in Comparative Example 5 with the exception that 6% by mass of tetrasodium pyrophosphate were added to the layered silicate used in Comparative Example 5. The results are set out in Table 3. With the use of Kunipia F the raw material of which has a mean particle diameter of greater than 100 nm, there were no flat particles formed even when the layered silicate powder granules were produced under the same conditions as in the example.

In Table 3, Examples 1 to 15 and Comparative Example 1 to 6 are tabulated.

TABLE 3

| | Raw Material | Raw Material's Concentration | Raw Material's Mean Particle Diameter | Whether or not the Rheology Modifier was used |
|---|---|---|---|---|
| Example 1 | LAPONITE RDS | 1% by mass | About 25 nm | About 8% by mass of tetrasodium pyrophosphate were added to LAPONITE RD powders |

TABLE 3-continued

| | Raw Material | Raw Material's Concentration | Raw Material's Mean Particle Diameter | Whether or not the Rheology Modifier was used |
|---|---|---|---|---|
| Example 2 | Smecton SA | 1% by mass | About 20 nm | About 6% by mass of tetrasodium pyrophosphate were added |
| Example 3 | LAPONITE RDS | 1% by mass | About 25 nm | About 8% by mass of tetrasodium pyrophosphate were added to LAPONITE RD powders |
| Example 4 | Smecton SA | 1% by mass | About 20 nm | About 6% by mass of tetrasodium pyrophosphate were added |
| Example 5 | Smecton SA | 1% by mass | About 20 nm | About 6% by mass of tetrasodium pyrophosphate were added |
| Example 6 | LAPONITE RDS | 1% by mass | About 25 nm | About 8% by mass of tetrasodium pyrophosphate were added to LAPONITE RD powders |
| Example 7 | LAPONITE RDS | 1.5% by mass | About 25 nm | About 8% by mass of tetrasodium pyrophosphate were added to LAPONITE RD powders |
| Example 8 | LAPONITE RDS | 2% by mass | About 25 nm | About 8% by mass of tetrasodium pyrophosphate were added to LAPONITE RD powders |
| Example 9 | LAPONITE RDS | 2.5% by mass | About 25 nm | About 8% by mass of tetrasodium pyrophosphate were added to LAPONITE RD powders |
| Example 10 | LAPONITE RDS | 3% by mass | About 25 nm | About 8% by mass of tetrasodium pyrophosphate were added to LAPONITE RD powders |
| Example 11 | LAPONITE RDS | 1% by mass | About 25 nm | About 8% by mass of tetrasodium pyrophosphate were added to LAPONITE RD powders |
| Example 12 | LAPONITE RDS | 1% by mass | About 25 nm | About 8% by mass of tetrasodium pyrophosphate were added to LAPONITE RD powders |

TABLE 3-continued

| | Raw Material | Raw Material's Concentration | Raw Material's Mean Particle Diameter | Whether or not the Rheology Modifier was used |
|---|---|---|---|---|
| Example 13 | LAPONITE RDS | 1% by mass | About 25 nm | About 8% by mass of tetrasodium pyrophosphate were added to LAPONITE RD powders |
| Example 14 | Smecton SA | 1% by mass | About 20 nm | About 6% by mass of tetrasodium pyrophosphate were added |
| Example 15 | LAPONITE RDS | 1% by mass | About 25 nm | About 8% by mass of tetrasodium pyrophosphate were added to LAPONITE RD powders |
| Comparative Example 1 | LAPONITE RD | 1% by mass | About 25 nm | Not used |
| Comparative Example 2 | Smecton SA | 1% by mass | About 20 nm | Not used |
| Comparative Example 3 | LAPONITE RD | 1% by mass | About 25 nm | Not used |
| Comparative Example 4 | LAPONITE RD | 1% by mass | About 25 nm | Not used |
| Comparative Example 5 | Kunipia F | 1% by mass | 100~500 nm | Not used |
| Comparative Example 6 | Kunipia F | 1% by mass | 100~500 nm | About 6% by mass of tetrasodium pyrophosphate were added |

| | Rotation Number of the Disc (rpm) | Formation of the Flat Particles |
|---|---|---|
| Example 1 | 20,000 | ⊚ |
| Example 2 | 30,000 | ⊚ |
| Example 3 | 10,000 | ⊚ |
| Example 4 | 10,000 | ⊚ |
| Example 5 | 20,000 | ⊚ |
| Example 6 | 30,000 | ⊚ |
| Example 7 | 20,000 | ⊚ |
| Example 8 | 20,000 | ⊚ |
| Example 9 | 20,000 | ⊚ |
| Example 10 | 20,000 | ⊚ |
| Example 11 | 40,000 | ○ |
| Example 12 | 50,000 | ○ |
| Example 13 | 60,000 | ○ |
| Example 14 | 50,000 | Δ |
| Example 15 | 0 | Δ |
| Comparative Example 1 | 20,000 | X |
| Comparative Example 2 | 30,000 | X |
| Comparative Example 3 | 30,000 | X |
| Comparative Example 4 | 40,000 | X |
| Comparative Example 5 | 30,000 | X |
| Comparative Example 6 | 30,000 | X |

APPLICABILITY TO THE INDUSTRY

The layered silicate powder granules according to the invention are very effective for the production of diverse functional powder granules because they are capable of adsorbing and carrying a variety of cationic substances for microencapsulation in the subsequent steps. The ensuing layered silicate powder granules, because of being each a flat particle having an opening or recess in its surface center, are expected to have multiple applications to column chromatography fillers, catalyst carriers, cosmetics, pharmaceuticals (for biologically active agent protection, drug delivery or the like), pigments, coating materials and so on.

EXPLANATION OF THE REFERENCE NUMERALS

10: Chamber
20: Raw Material Feeder Mechanism
21: Raw Material Tank
22: Gas Spraying Nozzle
23: Outlet
30: Centrifugal Disc

What is claimed is:
1. A layered silicate powder granule comprising flat particles, each particle comprising an evaporation-spray-dried layered silicate and a rheology modifier for modifying a crystal edge face of the layered silicate, and having an opening or recess in its surface center, wherein the layered silicate is at least one selected from the group consisting of smectites, swelling synthetic micas, and vermiculites.

2. A layered silicate granule as recited in claim 1, wherein the layered silicate has the following general formula:

where n is a natural number of 1 to 3; $0.1 \leq a \leq 0.8$, $0 \leq c \leq 3$, $0 \leq d \leq 2$, $2 \leq c+d \leq 3$, $0 \leq e < 4$, and $0 \leq f \leq 2$; E is an interlayer n-valent cation and at least one atom selected from the group consisting of H, Li, Na, Mg, Ca, Zn, Sr, Fe, Ba, Ni, Cu, Co, Mn, Al, and Ga; and M1 being at least one metal selected from the group consisting of Mg, Fe, Mn, Ni, Zn, and Li, and M2 being at least one metal selected from the group consisting of Al, Fe, Mn, and Cr.

3. The layered silicate granule as recited in claim 1, wherein the layered silicate has a 2:1 type structure.

4. A layered silicate granule as recited in claim 1, wherein the smectites are selected from montmorillonite, beidellite, nontronite, saponite, hectorite and stevensite.

5. A layered silicate granule as recited in claim 1, wherein the swelling synthetic micas are selected from Na-tetrasilisic mica or Na-taeniolite.

6. A layered silicate granule as recited in claim 1, wherein the vermiculites are selected from dioctahedral type vermiculite or trioctahedral type vermiculite.

7. A layered silicate granule as recited in claim 1, wherein the rheology modifier is an anionic compound.

8. A layered silicate granule as recited in claim 1, wherein the rheology modifier contains an amount of 1 to 20 parts by mass per 100 parts by mass of the layered silicate.

9. A layered silicate granule as recited in claim 1, wherein the flat particle has an outer diameter of greater than 500 nm and less than 50 μm as observed and measured under a microscope, and a specific surface area ($S_t/V_t$) of the flat particle that is defined by a surface area ($S_t$) to volume ($V_t$) ratio is 1.1 to 2.0 times as large as that of a sphere having the same volume.

10. A layered silicate granule as recited in claim 9, wherein the layered silicate granule contains 60% or greater of the flat particles (counted as a number of particles) and 20% or less of spherical particles (counted as a number of particles), and the flat particle has a maximum particle diameter of 50 μm or less.

11. The functional granule for chromatography, adsorbents, drug delivery, catalysts, biologically active agent protection, pigments, or coatings, to which the layered silicate granule as recited in claim 1 is applied.

12. A method for producing a layered silicate granule according to claim 1, the method comprising:
spraying a suspension containing the layered silicate and the rheology modifier for modifying the crystal edge face of the layered silicate in an atmosphere in which a dispersion medium evaporates, and
evaporating and drying the dispersion medium.

13. A method for producing a layered silicate granule as recited in claim 12, wherein droplets of the suspension containing the layered silicate and the rheology modifier for modifying the crystal edge face of the layered silicate are sprayed and blown onto a centrifugal disc, and a film of the suspension formed in a disc shape is scattered by fast rotation of the centrifugal disc, after which the dispersion medium is evaporated and dried.

14. A method for producing a layered silicate granule as recited in claim 12, wherein the layered silicate has the following general formula:

where n is a natural number of 1 to 3; $0.1 \leq a \leq 0.8$, $0 \leq c \leq 3$, $0 \leq d \leq 2$, $2 \leq c+d \leq 3$, $0 \leq e < 4$, and $0 \leq f \leq 2$; E is an interlayer n-valent cation and at least one atom selected from the group consisting of H, Li, Na, Mg, Ca, Zn, Sr, Fe, Ba, Ni, Cu, Co, Mn, Al, and Ga; and M1 being at least one metal selected from the group consisting of Mg, Fe, Mn, Ni, Zn, and Li, and M2 being at least one metal selected from the group consisting of Al, Fe, Mn, and Cr.

15. A method for producing a layered silicate granule as recited in claim 12, wherein the layered silicate use is made of the layered silicate having a mean primary particle diameter of 10 nm to 100 nm as found by choosing particles at random, measuring one direction diameters of them along the crystal ab-axes under a microscope and taking an average.

16. A method for producing a layered silicate granule as recited in claim 12, wherein the suspension containing the layered silicate and the rheology modifier for modifying the crystal edge face of the layered silicate has a solid matter concentration of 0.1 to 20% by mass.

17. A method for producing a layered silicate granule as recited in claim 12, wherein the layered silicate powder granules are heated at a temperature of 350 to 800° C.

* * * * *